United States Patent
Lieberman et al.

(10) Patent No.: US 10,496,493 B1
(45) Date of Patent: Dec. 3, 2019

(54) METHOD AND SYSTEM FOR RESTORING APPLICATIONS OF PARTICULAR POINT IN TIME

(71) Applicant: EMC Corporation, Hopkinton, MA (US)

(72) Inventors: Amit Lieberman, Raanana (IL); Assaf Natanzon, Tel Aviv (IL); Jehuda Shemer, Kfar Saba (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 75 days.

(21) Appl. No.: 15/084,346

(22) Filed: Mar. 29, 2016

(51) Int. Cl.
*G06F 11/00* (2006.01)
*G06F 11/14* (2006.01)

(52) U.S. Cl.
CPC ...... *G06F 11/1469* (2013.01); *G06F 11/1451* (2013.01); *G06F 2201/805* (2013.01); *G06F 2201/84* (2013.01)

(58) Field of Classification Search
CPC ............. G06F 11/1469; G06F 11/1451; G06F 2201/805; G06F 2201/84
See application file for complete search history.

(56) References Cited

U.S. PATENT DOCUMENTS

| | | | | |
|---|---|---|---|---|
| 7,620,668 B2* | 11/2009 | Kathuria | ............. | G06F 11/1469 |
| 8,868,858 B2* | 10/2014 | Atluri | ................. | G06F 11/1451 711/161 |
| 9,697,011 B2* | 7/2017 | Kobres | ................. | G06F 9/4416 |
| 2006/0149793 A1* | 7/2006 | Kushwah | .......... | G06F 17/30067 |
| 2007/0027937 A1* | 2/2007 | McGrattan | .......... | G06F 11/1451 |
| 2011/0202905 A1* | 8/2011 | Mahajan | ................... | G06F 8/43 717/140 |
| 2012/0005167 A1* | 1/2012 | Khatawate | .......... | G06F 11/1456 707/654 |
| 2012/0203742 A1* | 8/2012 | Goodman | ........... | G06F 11/1451 707/646 |
| 2014/0115285 A1* | 4/2014 | Arcese | ................ | G06F 9/45533 711/162 |
| 2014/0149696 A1* | 5/2014 | Frenkel | .................... | G06F 12/16 711/162 |
| 2014/0189432 A1* | 7/2014 | Gokhale | ........... | G06F 17/30289 714/41 |

(Continued)

OTHER PUBLICATIONS

Key-value database, Wikipedia, pp. 1-2 (Year: 2015).*
POST HTTP, Wikipedia, pp. 1-4 (Year: 2015).*

*Primary Examiner* — Marc Duncan
*Assistant Examiner* — Jonathan D Gibson
(74) *Attorney, Agent, or Firm* — Womble Bond Dickinson (US) LLP

(57) ABSTRACT

According to one embodiment, a request is received for restoration, where the request includes an application identifier (ID) identifying a first application and a timestamp specifying a particular time and date (time/date) of past. A restore module executed by a processor identifies a first application bundle based on the timestamp and the application ID. The first application bundle includes an executable image of the first application and metadata describing an operating environment that hosted the first application at the particular time/date. The restore module restores the first application in a first operating environment configured based on the metadata of the first application bundle.

18 Claims, 6 Drawing Sheets

(56) References Cited

U.S. PATENT DOCUMENTS

2016/0048405 A1* 2/2016 Lang .................. G06F 9/45558
  718/1
2016/0132310 A1* 5/2016 Koushik .................. G06F 8/61
  717/176

* cited by examiner

| Application Name/ID | Timestamp/Version | Host (e.g., source) | Storage System (e.g., target) | Others |
|---|---|---|---|---|
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| 201 | 202 | 203 | 204 | 205 |

METHOD AND SYSTEM FOR RESTORING APPLICATIONS OF PARTICULAR POINT IN TIME

FIELD OF THE INVENTION

Embodiments of the present invention relate generally to data storage systems. More particularly, embodiments of the invention relate to restoring applications that have been backed up at a particular point in time.

BACKGROUND

Data storage utilization is continually increasing, causing the proliferation of storage systems in data centers. In particular, the size of the applications and the data generated there from is increasing. Moreover, systems/users are copying multiple copies of a given set of data to maintain multiple versions. For example, snapshots of a given database stored in a server are copied and stored over time, thereby allowing a given version/snapshot of a set of data to be restored. Thus, a typical client has an abundant amount of data to be copied. A typical network configuration includes multiple remote devices communicatively coupled to a central storage system for copying their data. The copied data can be subsequently restored to a target system from the storage system.

In some situations, there is a need to restore an application and its application data that has been copied at a particular time, as well as its original operating environment at that particular point in time. Such a restoration tends to be a manual process and error prone.

BRIEF DESCRIPTION OF THE DRAWINGS

Embodiments of the invention are illustrated by way of example and not limitation in the figures of the accompanying drawings in which like references indicate similar elements.

FIG. 2 is a block diagram illustrating an example of a catalog according to one embodiment of the invention.

DETAILED DESCRIPTION

Figure 1:
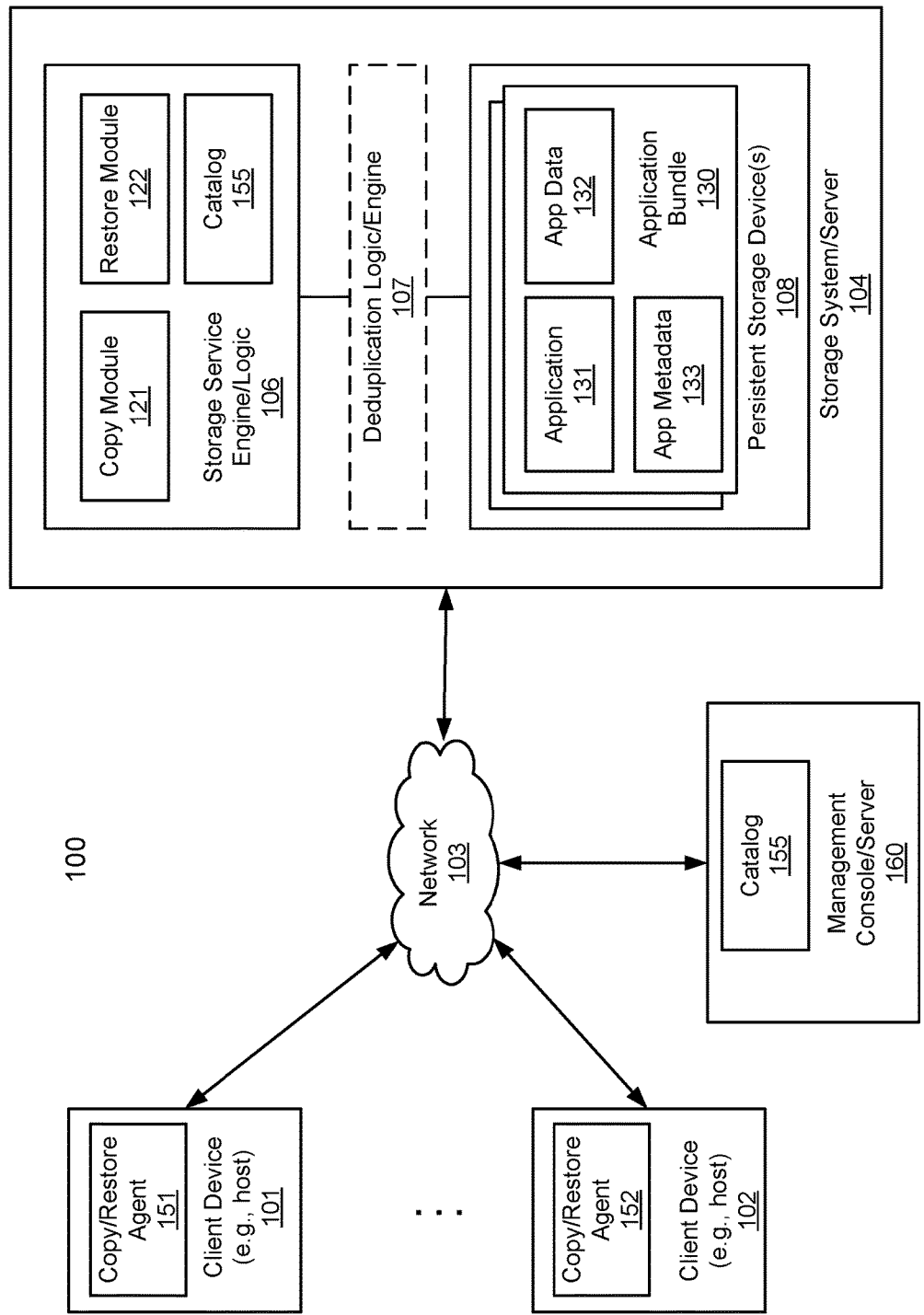
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a system is provided allows a user to interact and get access to an applications or parts of the application at any point in time and being served by the application that behaves exactly as it were at that time without any administration or explicit restoration of data. The system integrates at a REST (representational state transfer) or HTTP (hypertext transfer protocol) request level and can serve offline executing REST requests for an application or an interactive live copy from the past. Instead of having to orchestrate a complex restoration of an application and data services, change system clock times, install a previous application version and expose a new URL for the application, the system seamlessly integrates at the HTTP call level. Using an HTTP header describing the request "serve time" indicating the time and date of which the application was copied. In response to such an HTTP request, the corresponding application of a particular version at the point time is restored in an operating environment mirroring the actual operating environment at the point in time. The HTTP request includes a timestamp specifying a particular date and time of which the application was copied.

In one embodiment, a request is received at a storage system for restoring an application, where the request includes an application ID identifying the application and a timestamp specifying a particular time and date (time/date) in the past. The request may be a HTTP compatible request having proper fields such as key-value pairs specifying the application ID and the timestamp. In response to the request, a restore module identifies an application bundle based on the timestamp and the application ID. The application bundle includes, but is not limited to, an executable image of a particular version that was running at the time of the copying, application data that was being accessed by the application, and application metadata describing the circumstances of the application and the application data. The application metadata may describe an operating environment that hosted the application (e.g., a processor, a memory, a storage device, a network interface, a service connected to, etc. involved at the time). The application bundle is then restored to a target restore system. An operating environment is configured at the target restore system based on the metadata, which can be a virtual machine. The executable image of the application in the bundle is then executed within the operating environment and the application data in the bundle is loaded and accessible to the application.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically copy the content stored therein to a storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless.

Storage system 104 may include or represent any type of servers or a cluster of one or more servers (e.g., cloud servers). For example, storage system 104 may be a storage server used for various different purposes, such as to provide multiple users or client systems with access to shared data and/or to copy (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108. Storage service engine 106 may represent any storage service related components configured or adapted to provide storage services (e.g., storage as a service) to a variety of clients using any of the access protocols set forth above. For example, storage service engine 106 may include copy logic 121 and restore logic 122. Copy logic 121 is configured to receive and copy data from a client (e.g., clients 101-102) and to store the copied data in any one or more of storage device 108. Restore logic 122 is configured to retrieve and restore copied data from storage device 108 back to a client (e.g., clients 101-102).

Storage device 108 may be implemented locally (e.g., single node operating environment) or remotely (e.g., multi-node operating environment) via interconnect, which may be a bus and/or a network (e.g., a storage network or a network similar to network 103). Storage device 108 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system.

In response to a data file to be stored in storage device 108, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner in storage device 108.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file do not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

Deduplication of data happens in two logically distinct operations: detection and remapping. The detection operation identifies blocks containing the same data. The remapping operation updates address maps that record physical locations of logical units (LUNs) of data so that a single block of data is shared by multiple LUNs or by multiple positions within the same LUN. Detection is accomplished by building a database (e.g., index table) that maintains a digest (e.g., SHA, checksum) and, a deduplication key for each data block. When two data blocks have the same digest they have a sufficiently high probability of containing the same data to warrant a bit-for-bit comparison to confirm they are exact duplicates.

A goal of deduplication logic 107 is to maintain only a single copy of each unique set of data within a data set. To achieve that goal, deduplication logic 107 finds data blocks that have not been deduplicated and processes data blocks for deduplication by computing digests for data blocks. A digest is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table in order to process data blocks within the data set for deduplication. Further, a deduplication key identifying a data block is also stored in index table along with the digest for the data block.

A deduplication key uniquely identifies a data block by storing information (such as logical address, physical address) of the data block. Deduplication logic 107 identifies data blocks that can potentially be deduplicated by comparing digests of data blocks with list of digests stored in the index table. Further, when data blocks are deduplicated after comparing digest information, deduplication logic 107 updates metadata of deduplicated data blocks. Additionally, deduplication logic 107 updates metadata of a data block when the data block is reduplicated.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Referring back to FIG. 1, an application that has been copied, for example, from any of clients 101-102, may be stored in storage system 104 in a form of an application bundle such as application bundle 130 (also referred to as an enhanced copy of an application). Note that the term of "copy" or "copying" throughout this application refers to a variety of data protection methods or processes, such as, for example, backup, replication, mirroring, snapshots, clones, copying, archiving, file system versioning, traffic replay or any other technology. The copied data may be complete copies, diff copies, incremental copies, or any transformation of data representation including but not limited to compression, deduplication and encryption. In addition, combinations and/or multiples of these as parts of a copy (e.g., some parts of the application replicated, some parts backed-up) or sequencing of these (e.g., taking a snapshot, replicating that snapshot, taking a backup of the replicated snapshot, archiving that backup). This is especially relevant for the application bundles where different parts of the application may be protected by different protection technologies.

In one embodiment, each application bundle, in this example, application bundle 130, includes at least application 131, application data 132, and application metadata 133. Application 131 may be an executable image of an instance of the application running at the time of the copying or the snapshot being captured. Application data 132 may be the data accessed by application 131 at the time of the copying or the snapshot being captured. Application metadata 133 includes any information describing the runtime environment that hosted application 131 and application data 132 at the time of the copying or the snapshot being captured, including, for example, processing resources involved by application 131 at the time. Thus, when application bundle 130 was copied, a full working application and its data are captured. During the restoration, entire application, data, and the operating environment at the time of the copying can be restored (similar to a time machine).

Metadata 133 was generated at the time of the copying. Metadata 133 may include application operation parameters, which describe how to run the application, number of instances, scale out parameters, and availability information, etc. In addition, application metadata 133 includes metadata describing how to connect to additional resources, such as databases, object stores, data volumes, file systems, or any service that application was consuming at the time, etc. Application metadata 133 may further include metadata that provides information about the resources that the application utilizes including IDs, names, and/or types. Application metadata 133 further includes metadata controlling the execution of the application at the time. Application metadata 133 further includes metadata related to the copy itself, e.g., the timestamp, sizes, technologies, compression/archiving types, etc. Application bundle 130 may be backed up or replicated from any of clients 101-102. Application bundle 130 may be deduplicated by deduplication engine 107 and stored in a form of deduplicated segments.

In one embodiment, storage service logic 106 may maintain catalog 155 (e.g., a copy catalog) including information listing or describing the copied data (e.g., application bundle 130) stored in storage system 104. Catalog 155 can be utilized to restore any of the datasets (e.g., application bundle 130) from storage system 104 to any of target restore systems such as clients 101-102. Alternatively, catalog 155 may be maintained by a centralized management server 160. Management server 160 is configured to manage copy and restore operations for many storage systems. A user or an administrator can initiate a copy operation and/or a restore operation from management server 160. For example, a user can browse a list of application bundles that have been copied at different points in time and select one or more of them for restoration.

In one embodiment, any of clients 101-102 may further include a copy/restore module (e.g., copy/restore modules 151-152) responsible for copying and restoring data (e.g., application bundle 130) to and from storage system 104. Clients 101-102 may be part of a platform as a service (PaaS) system, where clients 101-102 may be PaaS nodes of a PaaS system. PaaS refers to a category of cloud computing services that provides a platform allowing customers to develop, run, and manage applications without the complexity of building and maintaining the infrastructure typically associated with developing and launching an app. PaaS can be delivered in two ways: as a public cloud service from a provider, where the consumer controls software deployment and configuration settings, and the provider provides the networks, servers, storage and other services to host the consumer's application; or as software installed in private data centers or public infrastructure as a service and managed by internal IT departments.

According to one embodiment, when a user initiates a restoration of an application that was copied at a particular point in time, either from management server 160 or from a console, a request is transmitted to storage system 104 and received by storage service engine 106. The request may be a HTTP or REST compatible request. The request includes a first field specifying an application name or ID identifying a target application and a timestamp specifying that particular point in time. In one embodiment, the application ID and the timestamp may be specified using a key-value pair format such as follows:

Application Name: ABC Database Software
Timestamp: 12/15/2015 12:30:00

Based on the application ID, a list of one or more application bundles, such as application bundle 130, which were copied at different point in time are identified. The application bundles in the list may be different versions or snapshots captured at different points in time. Based on the timestamp, one of the application bundles in the list may be selected. The selected application bundle may be copied or captured at a point in time within a predetermined proximity of the timestamp specified by the request. The selected application bundle is then restored to a target restore system specified by the request.

Alternatively, a catalog, such as catalog 155, is maintained listing some or all of the application bundles that have been captured and copied at different points in time at storage system 104. If the catalog is maintained in a management system (e.g., management server 160), the catalog may also include application bundles that have been copied and stored in other storage systems (not shown). A user or an administrator can access catalog 155 by logging into management server 160 or storage system 104 to browse and select one or more of the application bundles to be restored. A user interface, such as Web interface or graphical user interface (GUI), API, or CLI, can be utilized to specify the application name/ID and the timestamp for identifying a particular application bundle for restoration.

As described above, an application bundle includes at least an executable image of a particular version that was running at the time of the copying, application data that was being accessed by the application, and application metadata describing the circumstances of the application and the application data. The application metadata may describe an operating environment that hosted the application (e.g., a processor, a memory, a storage device, a network interface, etc. involved at the time). When an application is restored, an operating environment or execution environment will be established and configured based do the application metadata, including allocating proper resources, even setting up a system clock reflecting the time of the capture and copying. For example, a virtual machine may be provisioned and configured based on the application metadata, which mimics substantially the same operating environment at the time of the copying or capturing of the corresponding snapshot. An executable image of the application from the bundle is then executed within the operating environment and the application data is loaded into the memory and accessible by the application.

FIG. 2 is a block diagram illustrating an example of a copy catalog according to one embodiment of the invention. For example, catalog 200 may represent any of the catalogs described above, such as, for example, catalog 115 of FIG. 1. Note that catalog 200 is shown in a form of a table, however, catalog 200 can be implemented in a variety of data structures (e.g., database accessible via an API). Referring to FIG. 2, in this example, catalog 200 represents a global catalog, which may be maintained in a management server such as management server 160 of FIG. 1.

In one embodiment, catalog 200 includes multiple entries, where each entry represents an application bundle that has been copied at a specific point in time. In this example, each entry includes an application ID or an application bundle ID 201 identifying a specific application, timestamp 202, a host ID 203 identifying a host that originally hosted the application (e.g., a source system), storage location ID 204 identifying a storage system in which the corresponding application bundle is stored (e.g., target system), and other information 205.

In one embodiment, in response to a request to restore an application of a particular point in time, a lookup operation is performed in catalog 200 based on application ID 201 and timestamp 202. To improve the efficiency of the lookup operation, entries of catalog 200 may be indexed based on hash values that are generated based on a combination of application ID 201 and timestamp 202. If there is a match, a storage system storing the application bundle can be identified based on storage location ID 204 and it can be restore back to a host identified by host ID 203 or another system specified by the request.

According to another embodiment, catalog 200 may be a per-application catalog. Thus, there is a catalog for each application to store all of the application bundles (e.g., application instances) that have been copied at different points in time. In such a configuration, once the application has been identified from the request, a catalog for that particular application can be identified. An application bundle can then be identified based on the timestamp that is specified by the request. The identified application bundle can then be restored.

Figure 3:
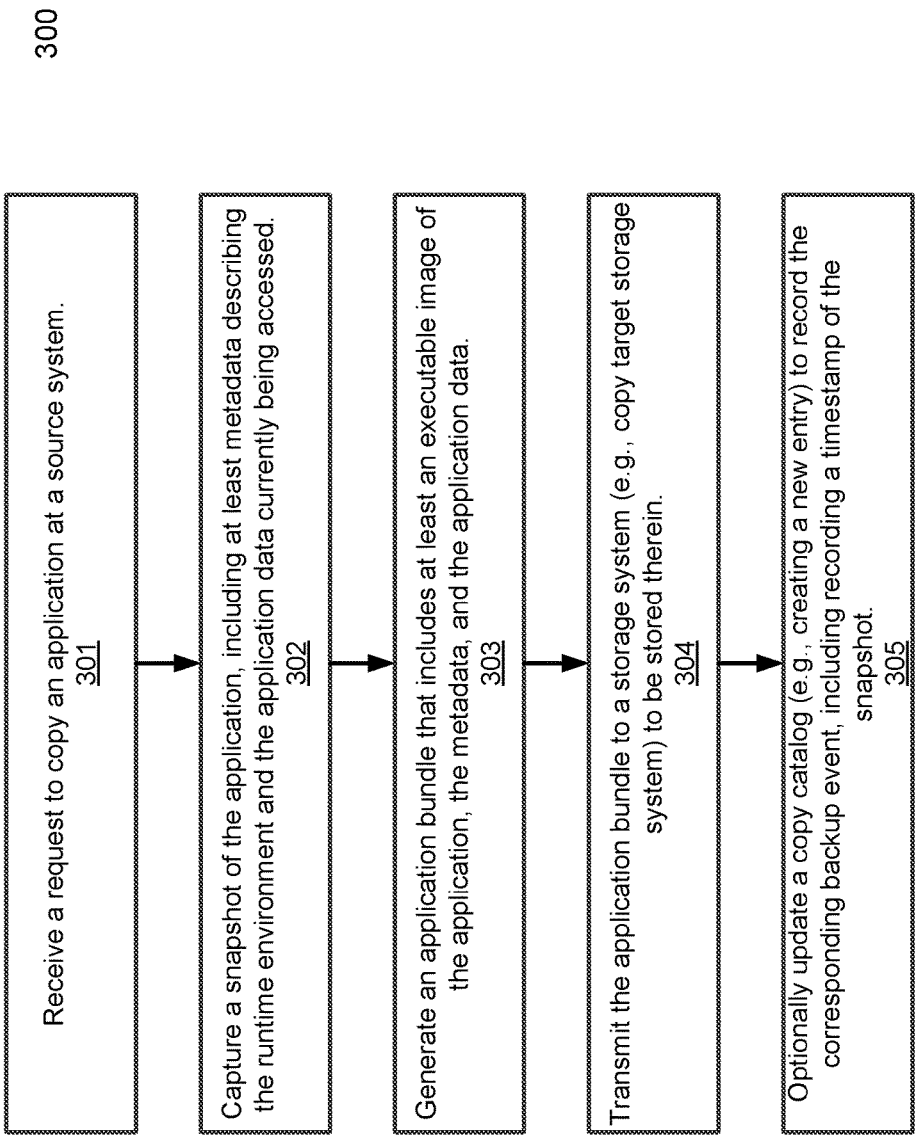
FIG. 3 is a flow diagram illustrating a process for copying data according to one embodiment of the invention.

FIG. 3 is a flow diagram illustrating a process for backing up data according to one embodiment of the invention. Process 300 may be performed by processing logic that includes hardware (e.g. circuitry, dedicated logic, etc.), software (e.g., embodied on a non-transitory computer readable medium), or a combination thereof. For example, process 300 may be performed by copy/restore agents 151-152 of FIG. 1. Referring to FIG. 3, at block 301, processing logic receives a request to copy an application. At block 302, processing logic captures a snapshot of the application, including at least an executable image of a current instance of the application, application data being accessed, and metadata describing an operating environment in which the application is running as described above. At block 303, processing logic generates an application bundle having at least the executable image of the application, application data, and the metadata associated with the snapshot. At block 304, the application bundle is copied to a storage system to be stored therein. At block 305, processing logic optionally updates in a catalog (e.g., creating a new entry) to record the copying transaction, including recording a timestamp of the copying transaction.

Figure 4:
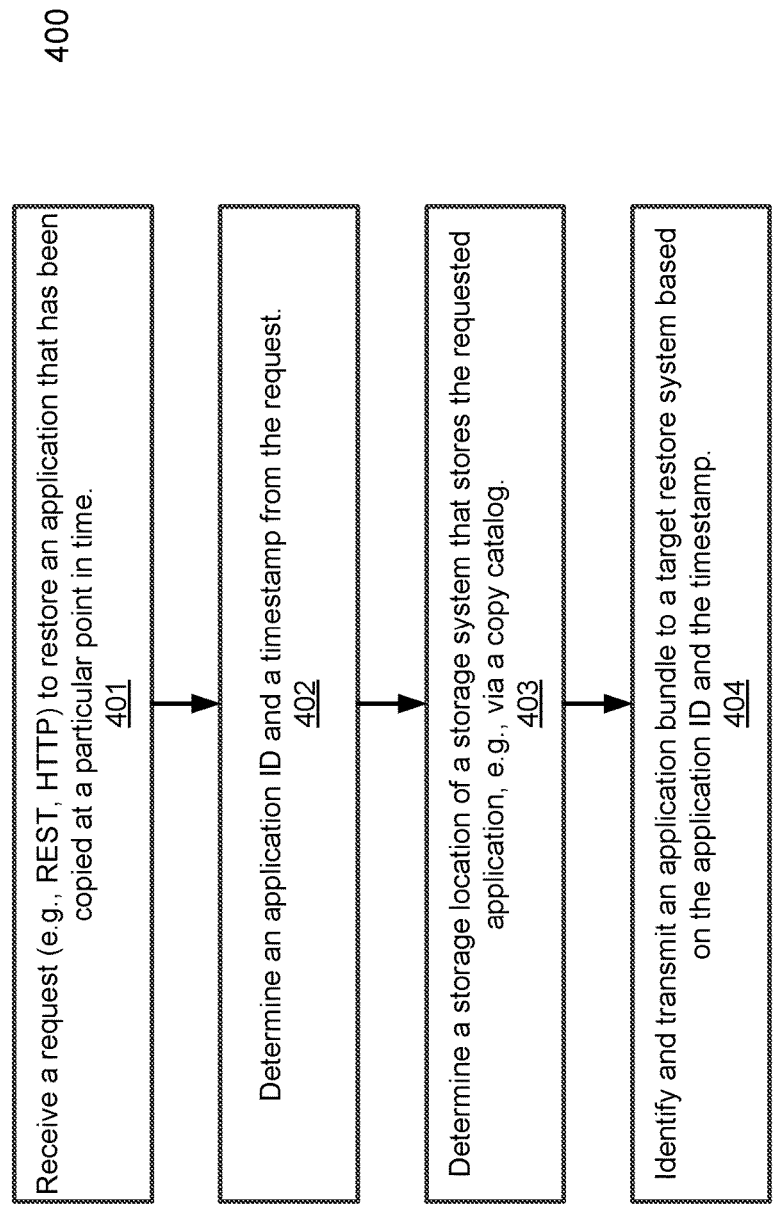
FIG. 4 is a flow diagram illustrating a process for restoring data according to one embodiment of the invention.

FIG. 4 is a flow diagram illustrating a process for restoring data according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by storage service module 106 of FIG. 1. Referring to FIG. 4, at block 401, processing logic receives a request to restore an application of a particular point in time. The request may be compatible with a REST request or any other HTTP requests. At block 402, processing logic determines from the request an application ID identifying the application and a timestamp representing the time of the copying. The request may include one or more parameters or attributes specifying the application ID and timestamp as set forth above. At block 403, processing logic determines, for example, via a copy catalog, an application bundle based on the application ID and the timestamp and determines a storage location of a storage system that stores the application bundle. At block 404, the application bundle is then restored to a target system specified by the request.

Figure 5:
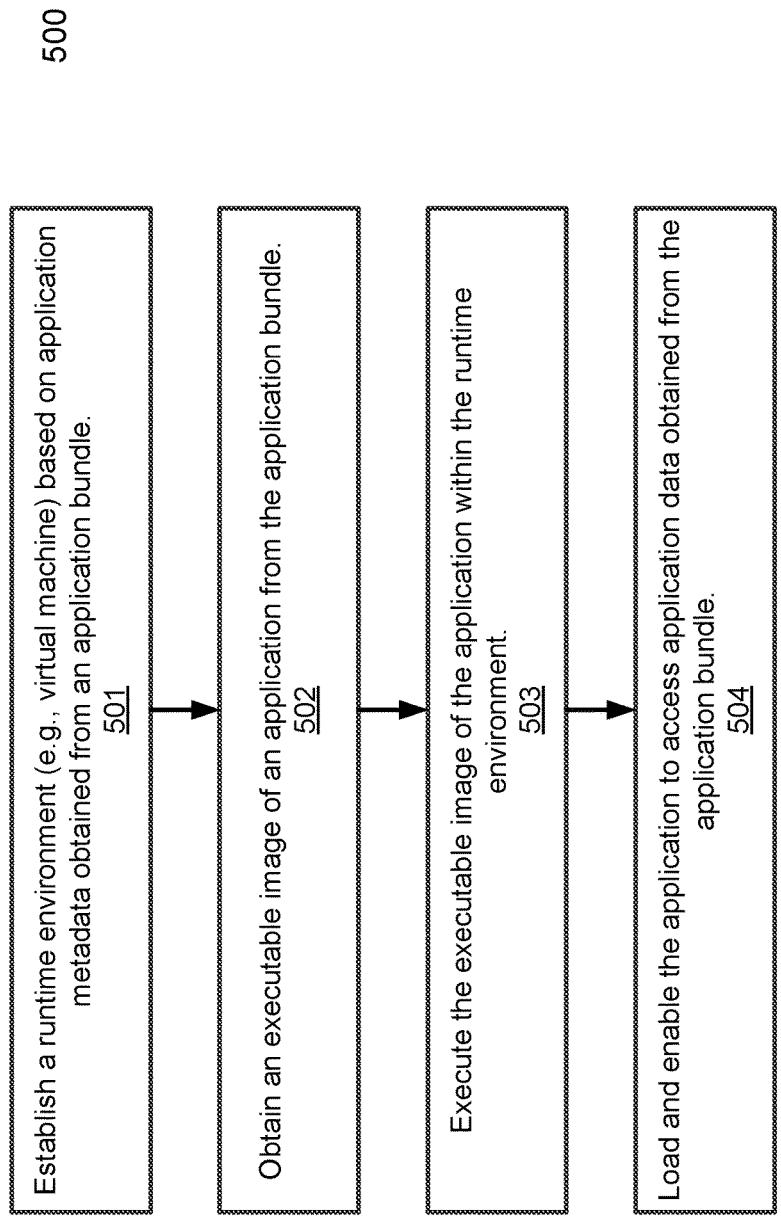
FIG. 5 is a flow diagram illustrating a process for restoring data according to one embodiment of the invention.

FIG. 5 is a flow diagram illustrating a process for restoring data according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by copy/restore modules 151-152 of FIG. 1. Referring to FIG. 5, at block 501, processing logic establishes and configures an operating/runtime environment (e.g., virtual machine) based on application metadata of an application bundle received from a storage system, including allocating proper processing resources (e.g., processor, memory, storage, operating system, network stack, proper system clock). Certain services that were utilized or connected with may also be restored based on the application metadata. The application metadata may further include parameters controlling whether to restore all of the above features/services, or partial of the features/services, restore only the data instead of the executable image of the application. The parameters may also control the way the runtime environment is set up. For example, a restoration for a development environment may not restore all the runtime services or may restore them at a lower service level agreement (SLA), etc. The application bundle was captured and copied at a particular point in time. At block 502, an executable image representing a particular instance or version of the application and its application data are obtained from the application bundle. At block 503, the executable image is then executed within the operating environment. At block 504, the application data is loaded to allow the application to access.

Note that some or all of the components as shown and described above (e.g., storage service engine/logic 106 and/or deduplication engine 107 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
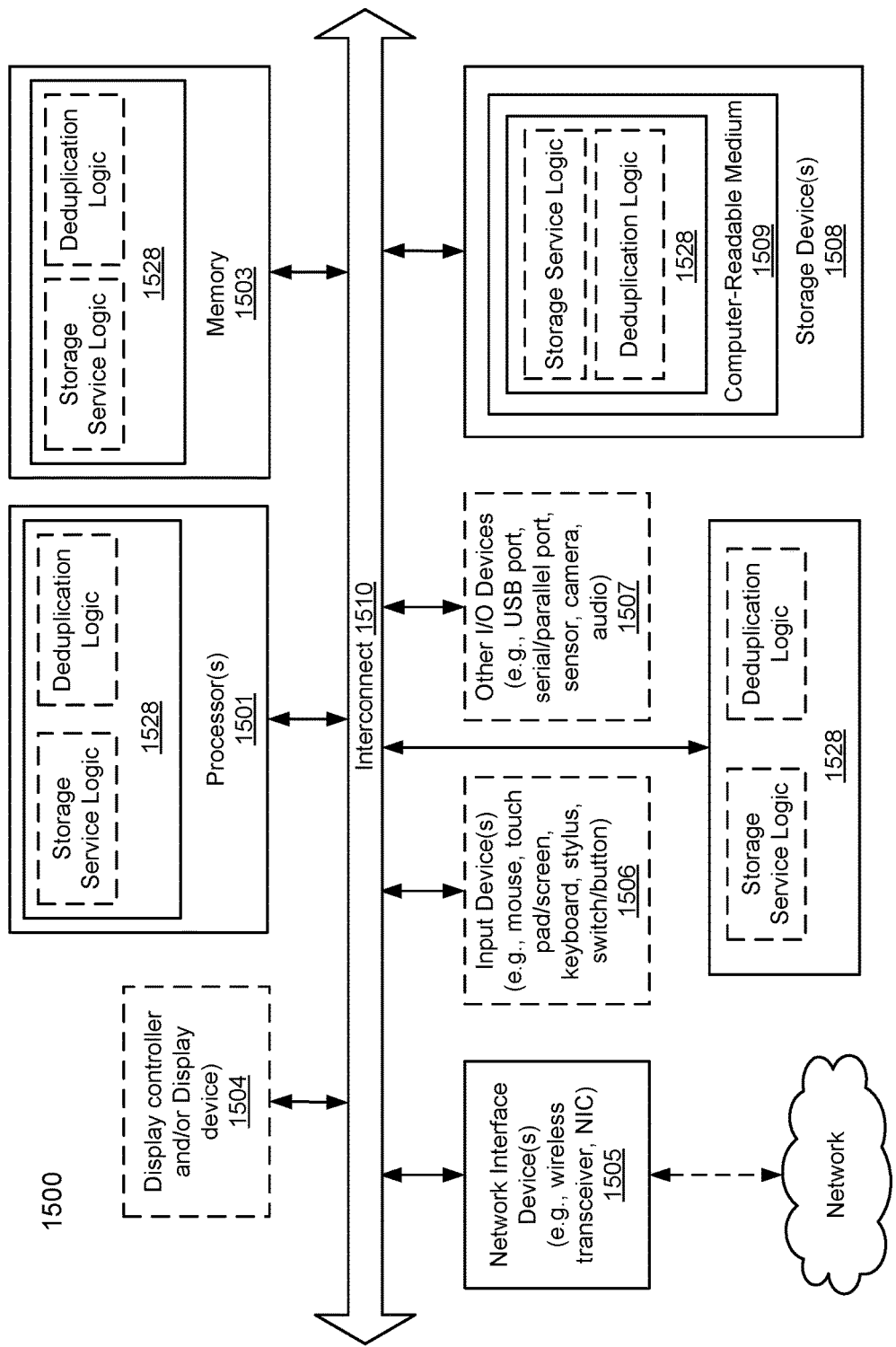
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for restoring an application that has been backed up at a particular point in time, the method comprising:
   receiving a request for restoration, the request including an application identifier (ID) identifying a first application and a timestamp specifying a particular time and date (time/date) of past, wherein the request is a hypertext transport protocol (HTTP) compatible request including a first field storing the application ID and a second field storing the timestamp in a key-value pair manner, and wherein the second field storing the timestamp is an HTTP header field;
   identifying by a restore module executed by a processor a first application bundle based on the timestamp and the application ID, wherein the first application bundle includes an executable image of a first version of the first application associated with the particular time/date and metadata describing an operating environment in which the executable image of the first application was executed at the particular time/date; and
   restoring by the restore module the first version of the first application in a first operating environment configured based on the metadata of the first application bundle, comprising provisioning and configuring a virtual machine that mimics the operating environment in which the executable image of the first version of the first application was executed at the particular time/date, the provisioning and configuring the virtual machine further comprising setting up a system clock that reflects the particular time/date specified by the timestamp, wherein the metadata describing the operating environment comprises a description of how to connect to resources the first version of the first application was consuming at the particular time/date, the resources comprising one or more of: a database, an object store, a data volume, a file system, or any combination thereof, and wherein the metadata further comprises one or more of: a processor description, a memory description, a storage device description, or a network interface description.

2. The method of claim 1, wherein identifying a first application bundle based on the timestamp and the application ID comprises:
   performing a lookup operation based on the application ID in a catalog to identify a list of one or more application bundles that are associated with the application ID; and
   identifying the first application bundle from the list of application bundles based on the timestamp.

3. The method of claim 2, wherein each of the application bundles in the list was copied and stored in the storage system at a different point in time in the past.

4. The method of claim 3, wherein each of the application bundles in the list further includes application data that was being accessed by a particular version of the first application at a corresponding point in time.

5. The method of claim 1, wherein the first application in a first operating environment configured based on the metadata of the first application bundle comprises:
   obtaining a first executable image of the first version of the first application from the first application bundle;
   establishing and configuring the first operating environment based on the metadata to mirror a previous operating environment that was configured at that particular time and date; and
   executing the first executable image of the first version of the first application in the first operating environment.

6. The method of claim 5, further comprising:
   obtaining first application data from the first application bundle, wherein the first application data was being accessed by the first version of the first application at the particular time/date; and
   causing the first version of the first application to load the first application data within the first operating environment.

7. A non-transitory machine-readable medium having instructions stored therein, which when executed by a processor, cause the processor to perform operations of restoring applications, the operations comprising:
   receiving a request for restoration, the request including an application identifier (ID) identifying a first application and a timestamp specifying a particular time and date (time/date) of past, wherein the request is a hypertext transport protocol (HTTP) compatible request including a first field storing the application ID and a second field storing the timestamp in a key-value pair manner, and wherein the second field storing the timestamp is an HTTP header field;
   identifying a first application bundle based on the timestamp and the application ID, wherein the first application bundle includes an executable image of a first version of the first application associated with the particular date/time and metadata describing an operating environment in which the executable image of the first application was executed at the particular time/date; and
   restoring the first version of the first application in a first operating environment configured based on the metadata of the first application bundle, comprising provisioning and configuring a virtual machine that mimics the operating environment in which the executable image of the first version of the first application was executed at the particular time/date, the provisioning and configuring the virtual machine further comprising setting up a system clock that reflects the particular time/date specified by the timestamp, wherein the metadata describing the operating environment comprises a description of how to connect to resources the first version of the first application was consuming at the particular time/date, the resources comprising one or more of: a database, an object store, a data volume, a file system, or any combination thereof, and wherein the metadata further comprises one or more of: a processor description, a memory description, a storage device description, or a network interface description.

8. The non-transitory machine-readable medium of claim 7, wherein identifying a first application bundle based on the timestamp and the application ID comprises:
performing a lookup operation based on the application ID in a catalog to identify a list of one or more application bundles that are associated with the application ID; and
identifying the first application bundle from the list of application bundles based on the timestamp.

9. The non-transitory machine-readable medium of claim 8, wherein each of the application bundles in the list was copied and stored in the storage system at a different point in time in the past.

10. The non-transitory machine-readable medium of claim 9, wherein each of the application bundles in the list further includes application data that was being accessed by a particular version of the first application at a corresponding point in time.

11. The non-transitory machine-readable medium of claim 7, wherein the first application in a first operating environment configured based on the metadata of the first application bundle comprises:
obtaining a first executable image of the first version of the first application from the first application bundle;
establishing and configuring the first operating environment based on the metadata to mirror a previous operating environment that was configured at that particular time and date; and
executing the first executable image of the first version of the first application in the first operating environment.

12. The non-transitory machine-readable medium of claim 11, wherein the operations further comprise:
obtaining first application data from the first application bundle, wherein the first application data was being accessed by the first version of the first application at the particular time/date; and
causing the first version of the first application to load the first application data within the first operating environment.

13. A data processing system, comprising:
a processor; and
a memory coupled to the processor storing instructions, which when executed by the processor, cause the processor to perform restore operations, the operations including
receiving a request for restoration, the request including an application identifier (ID) identifying a first application and a timestamp specifying a particular time and date (time/date) of past, wherein the request is a hypertext transport protocol (HTTP) compatible request including a first field storing the application ID and a second field storing the timestamp in a key-value pair manner, and wherein the second field storing the timestamp is an HTTP header field,
identifying a first application bundle based on the timestamp and the application ID, wherein the first application bundle includes an executable image of a first version of the first application associated with the particular time/date and metadata describing an operating environment in which the executable image of the first application was executed at the particular time/date, and
restoring the first version of the first application in a first operating environment configured based on the metadata of the first application bundle, comprising provisioning and configuring a virtual machine that mimics the operating environment in which the executable image of the first version of the first application was executed at the particular time/date, the provisioning and configuring the virtual machine further comprising setting up a system clock that reflects the particular time/date specified by the timestamp, wherein the metadata describing the operating environment comprises a description of how to connect to resources the first version of the first application was consuming at the particular time/date, the resources comprising one or more of: a database, an object store, a data volume, a file system, or any combination thereof, and wherein the metadata further comprises one or more of: a processor description, a memory description, a storage device description, or a network interface description.

14. The system of claim 13, wherein identifying a first application bundle based on the timestamp and the application ID comprises:
performing a lookup operation based on the application ID in a catalog to identify a list of one or more application bundles that are associated with the application ID; and
identifying the first application bundle from the list of application bundles based on the timestamp.

15. The system of claim 14, wherein each of the application bundles in the list was copied and stored in the storage system at a different point in time in the past.

16. The system of claim 15, wherein each of the application bundles in the list further includes application data that was being accessed by a particular version of the first application at a corresponding point in time.

17. The system of claim 13, wherein the first application in a first operating environment configured based on the metadata of the first application bundle comprises:
obtaining a first executable image of the first version of the first application from the first application bundle;
establishing and configuring the first operating environment based on the metadata to mirror a previous operating environment that was configured at that particular time and date; and
executing the first executable image of the first version of the first application in the first operating environment.

18. The system of claim 17, wherein the operations further comprise:
obtaining first application data from the first application bundle, wherein the first application data was being accessed by the first version of the first application at the particular time/date; and
causing the first version of the first application to load the first application data within the first operating environment.

* * * * *